US 9,149,156 B2

(12) United States Patent
Rosenzweig et al.

(10) Patent No.: US 9,149,156 B2
(45) Date of Patent: Oct. 6, 2015

(54) FOOD PROCESSOR

(71) Applicant: Euro-Pro Operating LLC, Newton, MA (US)

(72) Inventors: Mark Rosenzweig, Chestnut Hill, MA (US); David M. Audette, Webster, MA (US)

(73) Assignee: SharkNinja Operating LLC, Newton, MA (US)

( * ) Notice: Subject to any disclaimer, the term of this patent is extended or adjusted under 35 U.S.C. 154(b) by 255 days.

(21) Appl. No.: 13/780,730

(22) Filed: Feb. 28, 2013

(65) Prior Publication Data

US 2013/0264404 A1 Oct. 10, 2013

Related U.S. Application Data

(60) Provisional application No. 61/621,662, filed on Apr. 9, 2012.

(51) Int. Cl.
*A47J 43/04* (2006.01)
*A47J 43/07* (2006.01)
*A47J 43/08* (2006.01)
(Continued)

(52) U.S. Cl.
CPC .............. *A47J 43/0722* (2013.01); *A47J 43/04* (2013.01); *A47J 43/085* (2013.01); *B01F 7/00275* (2013.01); *B01F 7/00641* (2013.01); *B01F 7/162* (2013.01); *B01F 13/1044* (2013.01); *B01F 15/00435* (2013.01); *B01F 2013/108* (2013.01); *Y10T 29/49826* (2015.01)

(58) Field of Classification Search
CPC .... A47J 43/06; A47J 43/085; B01F 15/00435
USPC .............................. 241/282.1, 282.2
See application file for complete search history.

(56) References Cited

U.S. PATENT DOCUMENTS 2,209,287 A   7/1940  Simpson
2,546,949 A   3/1951  Morrison
(Continued)

FOREIGN PATENT DOCUMENTS

CN      2787112 Y    6/2006
CN    201996377 U   10/2011
(Continued)

OTHER PUBLICATIONS

International Search Report and Written Opinion for PCT/US2013/057205 mailed Nov. 27, 2013.
(Continued)

*Primary Examiner* — Mark Rosenbaum
(74) *Attorney, Agent, or Firm* — Wolf, Greenfield & Sacks, P.C.

(57) ABSTRACT

Food processing assemblies for rotating two processing tools inside a container at two different speeds and/or directions and methods for using such a processing assembly are disclosed. The two processing tools are vertically spaced along the longitudinal axis of the processing assembly. A motor drives the first processing tool and a transmission system, and the transmission system drives the second processing tool. The transmission system outputs a rotation speed and/or direction is different from that of the motor to drive the second processing tool. The transmission system may be located between the two processing tools within the food-containing volume of the container.

21 Claims, 13 Drawing Sheets

(51) Int. Cl.
    *B01F 7/00*     (2006.01)
    *B01F 7/16*     (2006.01)
    *B01F 13/10*    (2006.01)
    *B01F 15/00*    (2006.01)

(56) References Cited

U.S. PATENT DOCUMENTS

| | | | |
|---|---|---|---|
| 2,798,700 A | | 7/1957 | Corbett et al. |
| 2,807,447 A | | 9/1957 | Vaughan |
| 2,930,596 A | | 3/1960 | Waters |
| 3,603,364 A | * | 9/1971 | Samuelian et al. ...... 241/199.12 |
| 4,071,789 A | | 1/1978 | Ernster et al. |
| 4,076,180 A | * | 2/1978 | Liu ............................... 241/154 |
| 4,153,210 A | * | 5/1979 | Schaeffer ................... 241/282.1 |
| 4,256,407 A | | 3/1981 | Seiderman |
| 4,274,023 A | | 6/1981 | Lamprey |
| 4,339,205 A | | 7/1982 | Kato et al. |
| 4,403,868 A | | 9/1983 | Kupka |
| 4,480,926 A | | 11/1984 | Lattery, Jr. et al. |
| 4,509,860 A | | 4/1985 | Lasar, III |
| 4,802,407 A | * | 2/1989 | Negri et al. ...................... 99/453 |
| 4,854,720 A | | 8/1989 | Schold |
| 4,911,557 A | | 3/1990 | Dormer et al. |
| 5,190,375 A | | 3/1993 | Shiobara |
| 5,213,415 A | | 5/1993 | Saeki |
| 5,297,475 A | * | 3/1994 | Borger et al. ................... 99/348 |
| 5,350,235 A | | 9/1994 | Hagen et al. |
| 5,460,444 A | | 10/1995 | Howorka |
| 5,533,801 A | | 7/1996 | Safont et al. |
| 5,823,672 A | | 10/1998 | Barker |
| 5,823,673 A | | 10/1998 | Muntener |
| 6,012,837 A | | 1/2000 | Thuma |
| 6,050,720 A | | 4/2000 | Tuyuki |
| 6,164,812 A | | 12/2000 | Brezovnik et al. |
| 6,189,441 B1 | | 2/2001 | Beaudet et al. |
| 6,227,698 B1 | | 5/2001 | Muntener |
| 6,255,751 B1 | | 7/2001 | Hoffmann |
| 6,280,076 B1 | | 8/2001 | Muntener |
| 6,364,226 B1 | | 4/2002 | Kubicko |
| 6,604,455 B2 | | 8/2003 | Areh et al. |
| 6,640,693 B2 | | 11/2003 | Brezovnik et al. |
| 6,655,265 B2 | | 12/2003 | Pavlovic et al. |
| 6,681,687 B2 | | 1/2004 | Areh et al. |
| 6,690,128 B1 | | 2/2004 | Cotton et al. |
| 6,981,795 B2 | | 1/2006 | Nikkah |
| 6,986,476 B2 | | 1/2006 | Unteregger |
| D535,523 S | | 1/2007 | White |
| D545,126 S | | 6/2007 | White |
| 7,318,375 B2 | | 1/2008 | Huang |
| 7,350,963 B2 | | 4/2008 | Williams et al. |
| 7,395,751 B2 | | 7/2008 | Liu |
| 7,404,665 B2 | | 7/2008 | Bacher et al. |
| 7,422,169 B2 | | 9/2008 | Mueller |
| 7,585,102 B2 | | 9/2009 | Bacher et al. |
| 7,677,485 B2 | | 3/2010 | Gursel |
| 7,685,933 B2 | | 3/2010 | Fevre |
| 8,197,121 B2 | | 6/2012 | Sands |
| 8,251,573 B2 | | 8/2012 | Chou |
| 8,382,627 B2 | | 2/2013 | Cheung et al. |
| 2006/0158958 A1 | | 7/2006 | Romanik |
| 2009/0090254 A1 | | 4/2009 | Herren |
| 2009/0109793 A1 | | 4/2009 | Xue |
| 2009/0190439 A1 | | 7/2009 | Yeung |
| 2009/0193982 A1 | | 8/2009 | Chou |
| 2011/0101138 A1 | | 5/2011 | Unteregger et al. |
| 2011/0185920 A1 | | 8/2011 | Oblak et al. |
| 2011/0226140 A1 | | 9/2011 | Herren |
| 2012/0129643 A1 | | 5/2012 | Cheung et al. |
| 2013/0264401 A1 | | 10/2013 | Rosenzweig et al. |
| 2013/0264405 A1 | | 10/2013 | Audette |

FOREIGN PATENT DOCUMENTS

| | | |
|---|---|---|
| EP | 0 022 465 A1 | 1/1981 |
| EP | 0 570 685 A | 11/1993 |
| EP | 0 529 287 B1 | 9/1995 |
| GB | 1 447 430 A | 8/1976 |
| GB | 2 303 537 A | 2/1997 |
| WO | WO 00/36960 A1 | 6/2000 |
| WO | WO 2012/113667 A1 | 8/2012 |

OTHER PUBLICATIONS

International Search Report and Written Opinion for PCT/US2013/057210 mailed Dec. 18, 2013.

* cited by examiner

FOOD PROCESSOR

RELATED APPLICATIONS

This Application claims the benefit under 35 U.S.C. §119 (e) of U.S. Provisional Application Ser. No. 61/621,662, filed on Apr. 9, 2012, which is herein incorporated by reference in its entirety.

FIELD

Aspects herein generally relate to a processing assembly for a food processing apparatus and methods of processing food using a processing assembly. More specifically, aspects disclosed herein relate to food processor transmission systems which control the speed and/or direction of blades or other processing tools.

DISCUSSION OF RELATED ART

Food processors such as blenders use a rotating blade assembly to process food. Some food processors include two processing tools which rotate at different speeds relative to one another.

SUMMARY

According to one embodiment of the invention, a food processing apparatus includes a container, a lid, a food-containing volume defined between the lid and the container, and a processing assembly that couples to the container. The processing assembly includes a transmission system. When the processing assembly is coupled to the container, the transmission system is positioned in the food-containing volume.

According to another embodiment of the invention, a food processing apparatus includes a container with a food-containing volume. The food processing apparatus also includes a processing assembly with a first processing tool, a second processing tool and a transmission system. When the processing assembly is mounted to the container, the first and second processing tools are located within the food-containing volume, and the transmission system is vertically positioned between a height of the first processing tool and a height of the second processing tool.

According to yet another embodiment of the invention, a food processing apparatus includes a container with a food-containing volume. The food processing apparatus also includes a processing assembly including a first processing tool, a second processing tool, and a transmission system. When the processing assembly is mounted to the container, the first and second processing tools are located within the food-containing volume, and the transmission system is vertically positioned between a height of the first processing tool and a height of the second processing tool.

According to yet another embodiment of the invention, a food processing apparatus includes a container having a food-containing volume. The food processing apparatus also includes a processing assembly with a driven coupler, a first processing tool, a second processing tool, and a transmission system. The food processing apparatus also includes an input shaft which provides power to the transmission system. The first processing tool is rotatable by the input shaft. The food processing apparatus also includes an output shaft which receives power from the transmission system. The second processing tool is rotatable by the output shaft. The first processing tool is attached to a first portion of the input shaft, and the transmission system is attached to a second portion of the input shaft. The transmission system is attached to the output shaft. Finally, the transmission system is positioned between the first portion of the input shaft and the output shaft.

According to yet another embodiment of the invention, a method includes providing a container and a lid that engages with the container to define a food-containing volume. The method also includes coupling a processing assembly to the container. The processing assembly includes a transmission system, such that when the processing assembly is coupled to the container, the transmission system is positioned in the food-containing volume.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1A:
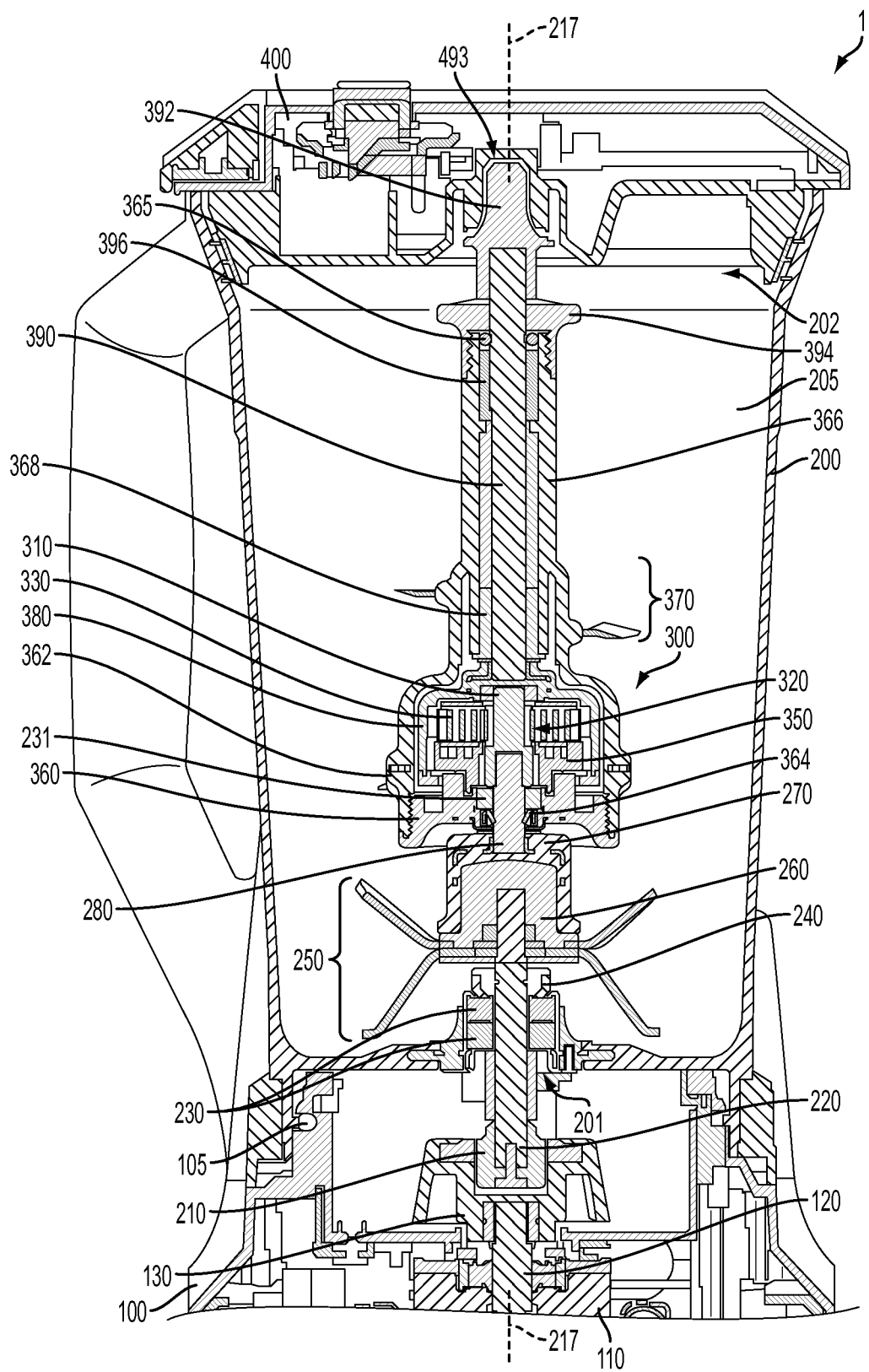
FIGS. 1A-1B are cross-sectional views that depict a processing assembly with a transmission system in accordance with an aspect of the invention.

Blenders and food processors can be arranged to rotate more than one processing tool at a time. For example, some food processors include two nested whisks or a blade that is nested within a whisk. In some cases, blenders and food processors are capable of rotating the two processing tools at different speeds and/or in different directions. In some arrangements, each processing tool is driven by its own motor and rotates at a different speed and/or direction relative to the other tool. In other arrangements, a single motor is used, and a gearing system is used to rotate two shafts to drive two processing tools at different output speeds and/or directions. In such arrangements, one tool shaft may be nested within the other tool shaft.

Provided herein are embodiments where a motor cooperates with a transmission system to drive two processing tools at different speeds and/or in different rotational directions within a food-containing volume of a blender or other food processor. Also provided herein are embodiments where the transmission system drives processing tools at the same speed as one another, but at a speed different from that of the motor. According to one aspect, the transmission system is positioned in the food-containing volume. According to another aspect, the transmission system is positioned between two processing tools. For example, a first processing tool such as a set of purée blades may be driven by a first shaft at a first speed. The first shaft also may drive a transmission system positioned above the purée blades. A transmission system output shaft may rotate at a lower speed than the first shaft, and drive a second processing tool such as chopping blades.

By providing an arrangement where a transmission is positioned within the food-containing volume of a container, blades with different speeds and/or directions can be provided with only a single shaft connection between the motor unit and the processing assembly. A conventional drive coupler may be used on the base motor unit and a conventional driven coupler may be used on the processing assembly, and the processing assembly may be mounted to the container. Further, a single shaft may pass through the container and thus include only one shaft seal.

With the transmission being part of the portion of the processing assembly that is internal to the container, transmissions having different speed ratios may be easily exchanged by using different processing assemblies. That is, a first processing assembly may have a transmission with a speed ratio of 4:1, and a second processing assembly may have a transmission with a speed ratio of 3:1, and the user can decide which ratio to use simply by choosing which processing assembly to place in the container.

In addition, with the transmission being part of the processing assembly and the processing assembly being removable from the container, if the transmission is damaged, the transmission can be easily replaced simply by substituting in a new processing assembly.

As used herein, the term "processing tool" refers to any tool used to process foods and other materials. Processing tools may include, but are not limited to, a blade assembly, a whisk, an ice crushing assembly, a dicing assembly, a grater, a shredder, a shredder/slicer assembly, a cubing attachment, a dough hook, a whipping attachment, a slicer attachment, and a french fry cutter. In some cases, a processing tool may be a tool that is used to clean the food processor container. A blade assembly may contain a single blade or more than one blade. As used herein, the term "food" includes any solid or liquid comestible, and any mix between a solid and a liquid.

As used herein, the terms "connected," "attached," or "coupled" are not limited to a direct connection, attachment, or coupling, as two components may be connected, attached, or coupled to one another via intermediate components.

According to one embodiment, as shown in FIG. 1A, a food processing apparatus 1 includes a lid 400, a container 200, and a base 100. The container 200 removably engages with the base 100 via a locking mechanism 105 which includes a collection of protrusions and indents on the base 100 and the container 200. The container can be removably fixed to the base by placing the container 200 onto the base 100 and twisting the container 200 relative to the base 100 to engage the mechanical locking mechanism 105 between the container 200 and the base 100 as is well known. Any suitable locking mechanism can be used, as this aspect is not so limited. For example, the container may engage with the base by pressing the container down onto the base or by sliding the container laterally onto the base.

In some embodiments, the container does not lock or engage with the base, but instead only operatively interacts with the base, for example to receive rotational power from the base.

The container 200 may be any suitable volume and design. In some cases, the container is a small single-serve jar that may be used as a drinking cup after the processing assembly is removed from the jar. In some cases, the container is a larger pitcher that can hold multiple servings. The container may include a handle and a spout to facilitate pouring of contents and/or the lifting and moving of the container. The lid 400 may include a hole through which food can pass such that food can be added to or removed from the food-containing volume 205 without removing the lid 400 from the container 200. A cap may be used to cover or uncover such a hole in the lid. The cap may attach to the lid in any suitable manner, for example, via threads that allow the cap to be screwed onto the lid, by a hinge that connects the cap to the lid, or via an interference fit, as this aspect is not limited in this regard.

Figure 1B:
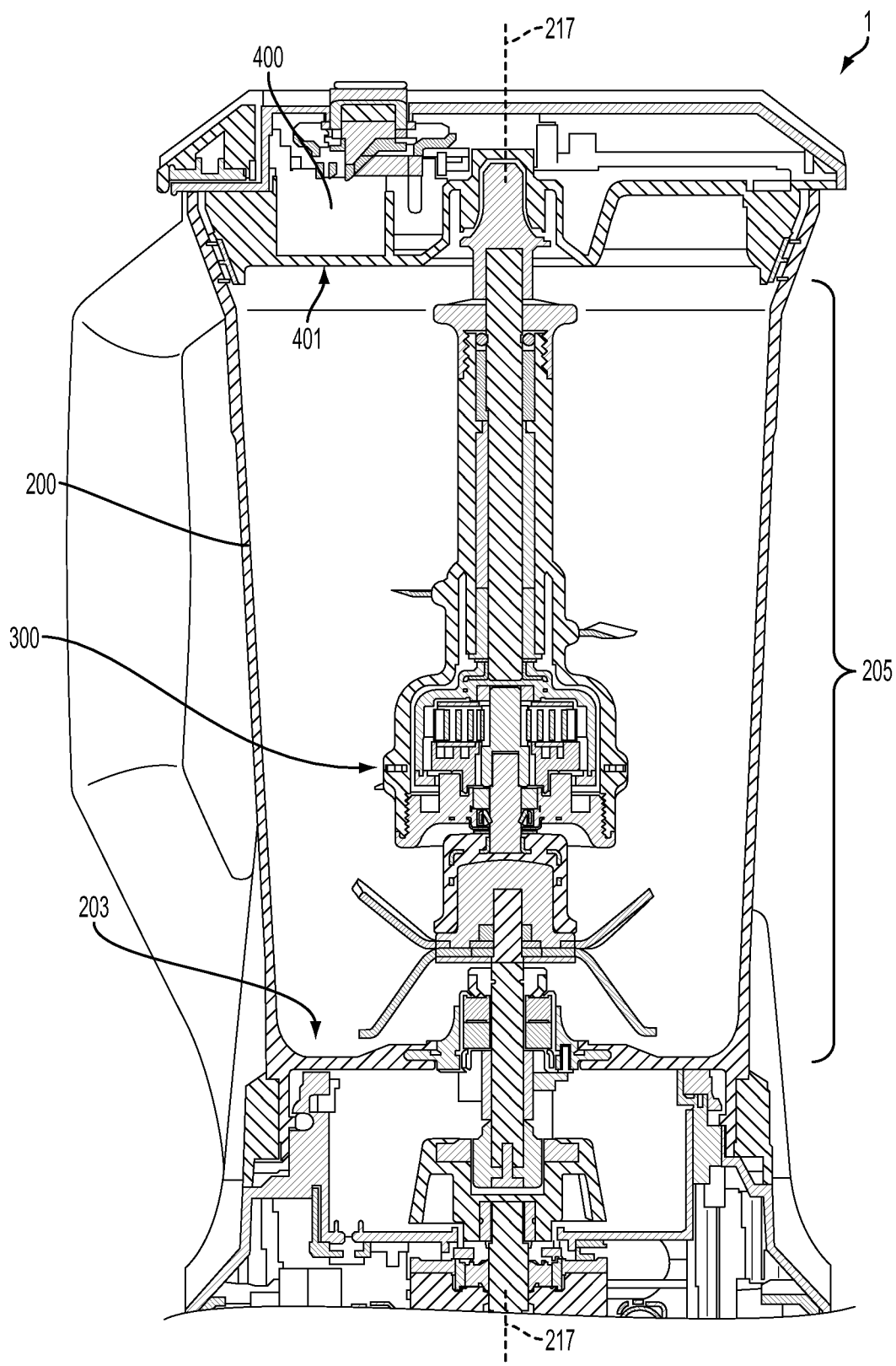
Figure 2:
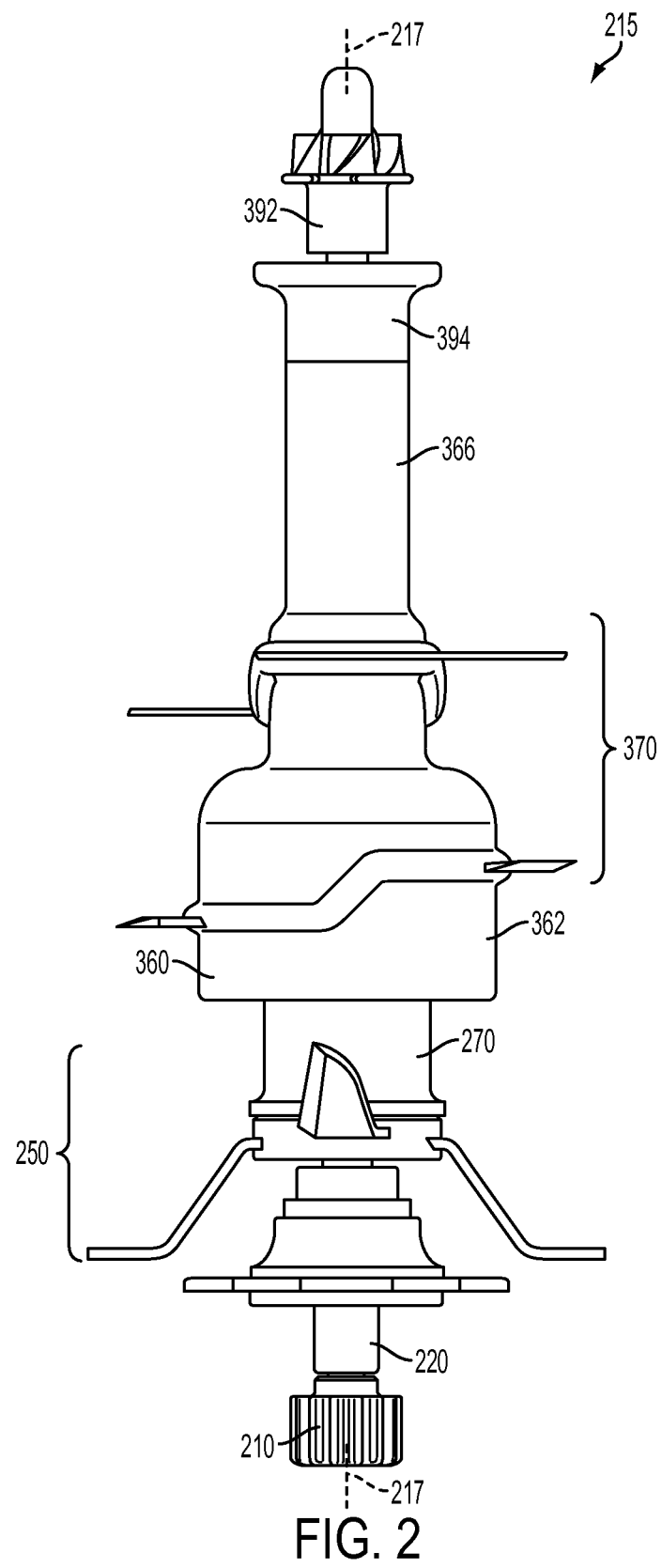
FIG. 2 is a side view that depicts the processing assembly depicted in FIGS. 1A-1B.

As seen in FIG. 1A, the food processing apparatus 1 includes a transmission system 300 that is located inside the food-containing volume 205. As used herein, the "food-containing volume" is the volume in the container within which food is located during food processing. For example, as seen in FIG. 1B, the food-containing volume 205 is the space between the lowest surface 401 of the lid 400, the bottom inner surface 203 of the container 200, and the sides of the container 200. As seen in FIG. 2, a first processing tool 250 is vertically spaced from a second processing tool 370 along a longitudinal direction 217 of the processing assembly 215.

The transmission system may be vertically positioned between the vertical position of the first processing tool and the vertical position of the second processing tool. As shown in FIG. 1A, transmission system 300 is vertically positioned between the vertical position of the first processing tool 250 and the vertical position of the second processing tool 370. That is, the transmission system is between a horizontal plane that includes the first processing tool and a horizontal plane that includes the second processing tool. If the transmission system 300 were to be shifted horizontally to be offset from the rotational axes of the first and second processing tools, the transmission system 300 would still be considered vertically positioned between the height of the first processing tool 250 and the height of the second processing tool 370. In some embodiments, for example the embodiment shown in FIGS. 1A and 1B, the transmission system may be positioned directly between the first and second processing tools. That is, the transmission system is positioned both horizontally and vertically between the processing tools, in some case with the tools and the transmission aligned along the same axis. As used herein, the term "positioned between" refers to a relative physical location rather than a relative operational location within the path of power delivery. For example, as shown in FIG. 1A, transmission system 300 is physically located between first and second processing tools 250, 370. In the embodiment shown in FIG. 1A, the longitudinal axes of the transmission system 300, first processing tool 250, and second processing tool 370 are collinear with the longitudinal axis 217 of the processing assembly. In embodiments where the transmission system is collinear with the axes of rotation of the first and second processing tools, but the transmission system has a smaller diameter than the shafts upon which the first and second processing tools are mounted, the transmission system is still considered to be positioned directly between the first and second processing tools. That is, in some embodiments, the processing tools may have an inner diameter that is attached to the shaft such that the tools do not extend inwardly all the way to the axis of rotation. If the transmission has a small diameter, imaginary vertical projections extending from the transmission would not directly intersect the processing tools. However, such a transmission arrangement would be considered to be positioned directly between the first and second processing tools.

The base 100 includes a motor 110 which is connected to a drive shaft 120, which in turn is connected to a drive coupler 130. The drive coupler 130 interfaces with a driven coupler 210 of the processing assembly 215, as shown in FIG. 2. In some embodiments, the drive coupler 130 and the driven coupler 210 can be removably coupled to one another. In one embodiment, the driven coupler 210 is attached to the container 210 such that, when the container 200 is lifted off the base 100, the driven coupler 210 is removed from the drive coupler 130. In other embodiments, the drive coupler 130 may be permanently attached to the driven coupler 210.

Figure 3:
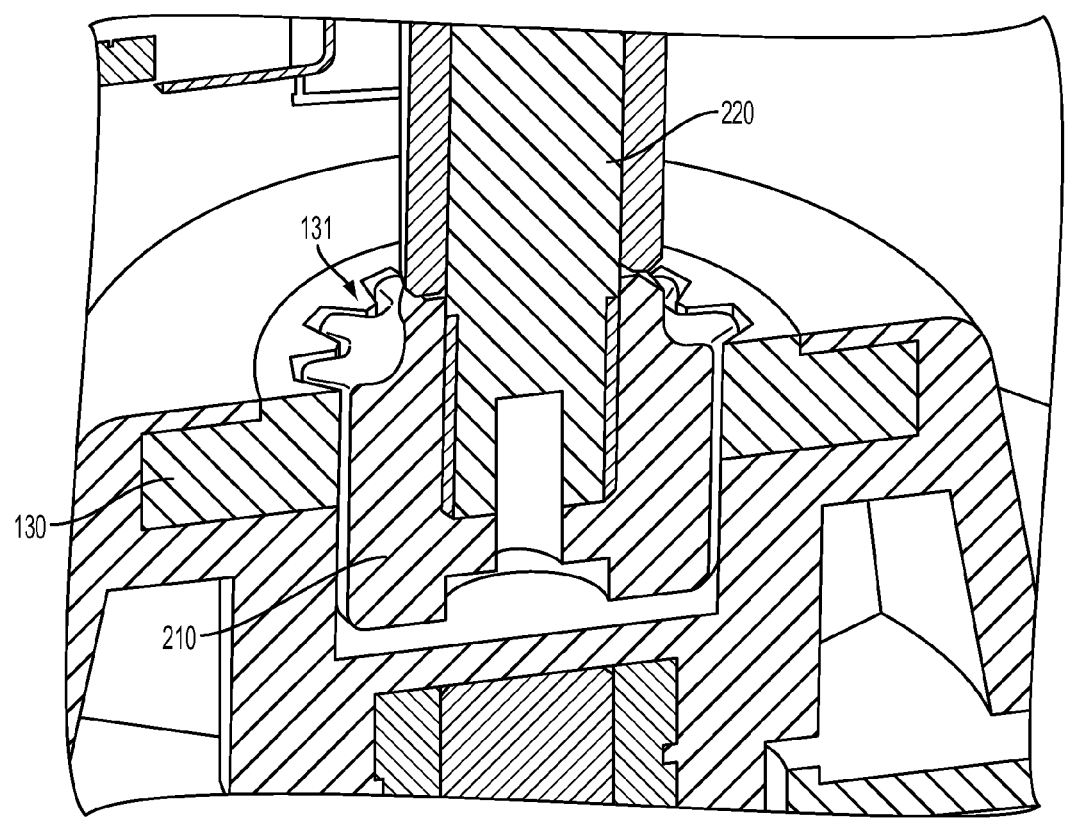
FIG. 3 is an enlarged view that depicts the interface between a drive coupler and a driven coupler in accordance with an aspect of the invention.

FIG. 3 shows an enlarged view of the interface between the drive coupler 130 and the driven coupler 210. The drive coupler 130 may include a recess with a plurality of protruding teeth 131. Any suitable number of teeth 131 may be used. When the recess of the drive coupler 130 receives the driven coupler 210, the motor 110 becomes connected to the processing assembly 215.

As shown in FIG. 1A, the motor 110 rotates the drive shaft 120, which rotates the drive coupler 130, which in turn drives the driven coupler 210. Rotation of the driven coupler 210 causes a first blade shaft 220 to rotate, which in turn causes a first blade holder 260 and the first blade assembly 250 to rotate. In the embodiment shown in FIG. 1A, the axes of rotation of the first blade shaft 220, an output shaft 366, and the drive coupler 130 are collinear. Ball bearings 230 or other bearings may be included facilitate to rotation of the first blade shaft 220 within the bottom opening 201 of the container 200, and a lip seal 240 may be used to seal off the bottom opening 201 of the container 200 such that fluid cannot flow through the bottom opening 201. The ball bearings 230 also may serve to attach the first blade shaft 220 to the container 200.

Figure 4:
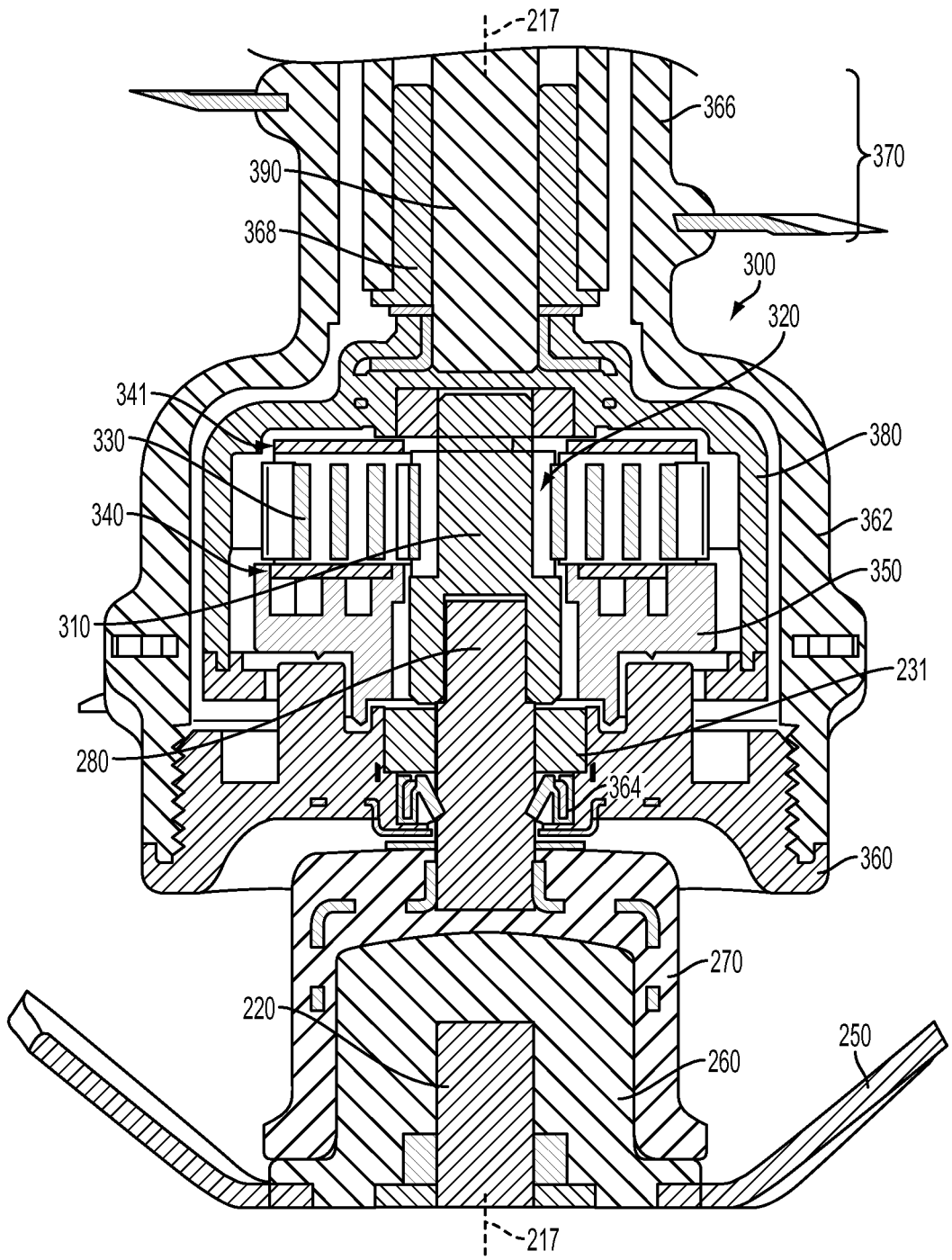
FIG. 4 is an enlarged cross-sectional view that depicts the transmission system depicted in FIGS. 1A-1B.

As seen in FIGS. 1A and 4, a transmission coupling 270 removably attaches to the top of the first blade holder 260 and couples the input shaft 280 of the transmission system 300 to the first blade holder 260. The transmission coupling 270, blade holder 260 and first blade shaft 220 serve as intermediate components that connect the input shaft 280 of the transmission system 300 to the drive shaft 120, thereby allowing the transmission system 300 to be driven by the motor 110.

The transmission system receives power from an input shaft and drives an output shaft. The input shaft is driven at a certain speed and direction by the motor. In some cases, the input shaft is directly driven at the same speed as the motor, and in some cases, gear reductions, overdrives or other suitable transmission systems may be used such that the input shaft rotates at a speed and/or a direction different from that of the motor. The transmission system receives power from the input shaft at a first speed and direction, and drives the output shaft at a different speed and/or direction. In some embodiments, the transmission system may be a reduction type transmission where the transmission system drives the output shaft at a speed that is lower than that of the input shaft, but at a higher torque than the input shaft. In other embodiments, the transmission system may be an overdrive type transmission where the transmission system drives the output shaft at a speed that is higher than that of the input shaft, but at a lower torque than the input shaft.

In some embodiments, the transmission system drives two or more processing tools at the same speed as one another, but at a speed different from that of the motor. In some cases, the processing tools are driven by the output shaft.

In some embodiments, shown in FIGS. 1A and 4, the transmission system 300 is a reduction type transmission where the transmission system 300 drives the output shaft 366 at a speed that is lower than that of the input shaft 280. Of course, it should be appreciated that any type of transmission system is possible, as this aspect is not limited to a reduction type transmission.

In one embodiment, the transmission system 300 is a planetary gear system with a sun gear 320 and a plurality of planet gears 330 surrounding the sun gear 320. The planetary gear system may have any number of planet gears, including 2, 3, 4, 5, 6, 7, 8, 9, 10, or more planet gears, as this aspect is not limited in this regard. As best seen in FIG. 4, the input shaft 280 of the transmission system 300 is coupled to a sun gear 320 via a sun gear coupling 310. In this embodiment, the sun axis is collinear with the longitudinal axis of the processing assembly 217. Rotation of the sun gear 320 about the sun axis 217 causes the planet gears 330 to both rotate about their own individual planet axes and revolve around the sun gear 320 within the ring gear 380. The ring gear 380 is held fixed to the lid 400 by the stationary shaft 390, as discussed below in detail.

The planet carrier includes two plates: an upper plate 341 and a lower plate 340. Each planet gear rotates about an axle that passes through the planet gear along the planet gear's longitudinal axis. The upper end of each axle is attached to the upper plate 341, and the lower end of each axle is attached to the lower plate 340. Revolution of the planet gears 330 around the sun gear 320 causes the upper and lower plates 341, 340 to rotate about the sun axis 217. The lower plate 340 is rotationally fixed to a planetary drive coupling 350 which in turn is rotationally fixed to the bottom cap 360. Thus, rotation of the lower plate 340 about the sun axis 217 causes the planetary drive coupling 350 and the bottom cap 360 to rotate about the sun axis 217 as well. The bottom cap 360 is fixed to transmission housing 362, which is fixed to or integrally formed with the output shaft 366. Thus, rotation of the bottom cap 360 about the sun axis 217 causes rotation of the transmission housing 362, output shaft 366 and second blade assembly 370 about the sun axis 217 as well. As seen in FIG. 1A, bearings 368 and 396 permit the output shaft 366 and the second blade assembly 370 rotate about the stationary shaft 390, while the stationary shaft 390 is held rotationally fixed to the lid 400.

In some embodiments, as shown in FIG. 4, the output shaft 366 and the transmission housing 362 are integrally formed with one another. In other embodiments, the output shaft and transmission housing may be separate components that are attached to one another either directly or via intermediate components.

In the embodiment shown in FIGS. 1A and 4, the transmission system 300 is a reduction type transmission. One rotation of the sun gear 320 results in less than one revolution of the planet gears 330 around the sun gear 320, and therefore less than one rotation of the lower plate 340, planetary drive coupling 350, bottom cap 360, and output shaft 366. Accordingly, the transmission system 300 outputs a rotation speed to the second blade assembly 370 that is lower than the input rotation speed of the input shaft 280. The input to output rotation speed ratio of the transmission system 300 is determined by the gear ratio between the sun gear 320 and the ring gear 380. In one embodiment, the planetary gear system provides an input to output rotation speed ratio of approximately 4.8 to 1. In some embodiments, the first processing assembly 250 is rotated at 24,000 RPM, and the second processing assembly is rotated at 5,000 RPM. It should be appreciated that any suitable input to output rotation speed ratio may be used, and the first and second processing assemblies may be rotated at any suitable rotation speed, as this aspect is not limited in this regard. Gear systems other than planetary gear systems such as a step gear system, worm gears, beveled gears, and/or spur gears may be used in some embodiments.

According to another aspect, a portion of the transmission system is rotationally fixed relative to the container. In a planetary gear system, one of the sun gear, planet carrier, or ring gear is held stationary to produce an output the differs from the input. In the embodiment shown in FIGS. 1A and 4, the ring gear is rotationally fixed relative to the container. In such an arrangement, the planetary gear system serves as a reduction type transmission. The ring gear may be held stationary relative to the container in any suitable manner. In some embodiments, the ring gear may be fixed to the lid of the container via intermediate components. In one embodiment, as best seen in FIG. 1A, the ring gear 380 is fixed to a stationary shaft 390. The stationary shaft 390 is connected to a lid coupling 392, and the lid coupling 392 is rotationally fixed to the lid 400 (though lid 400 may be removed from lid coupling 392 when the blender is not in operation). In some embodiments, the lid coupling may be positioned such that the lid coupling is recessed further into the lid than shown in FIG. 1A.

Figure 5:
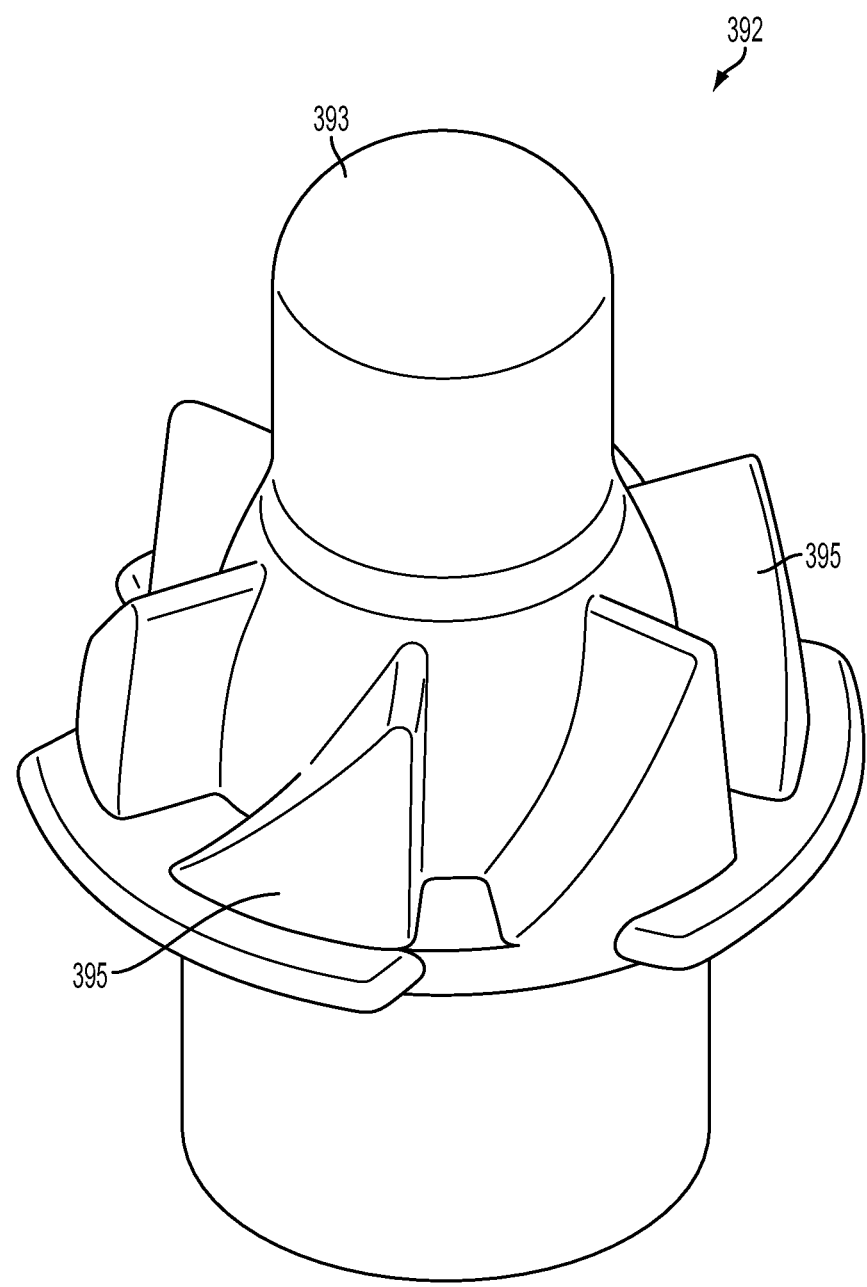
FIG. 5 is an enlarged perspective view that depicts a lid coupling in accordance with an aspect of the invention.
Figure 6:
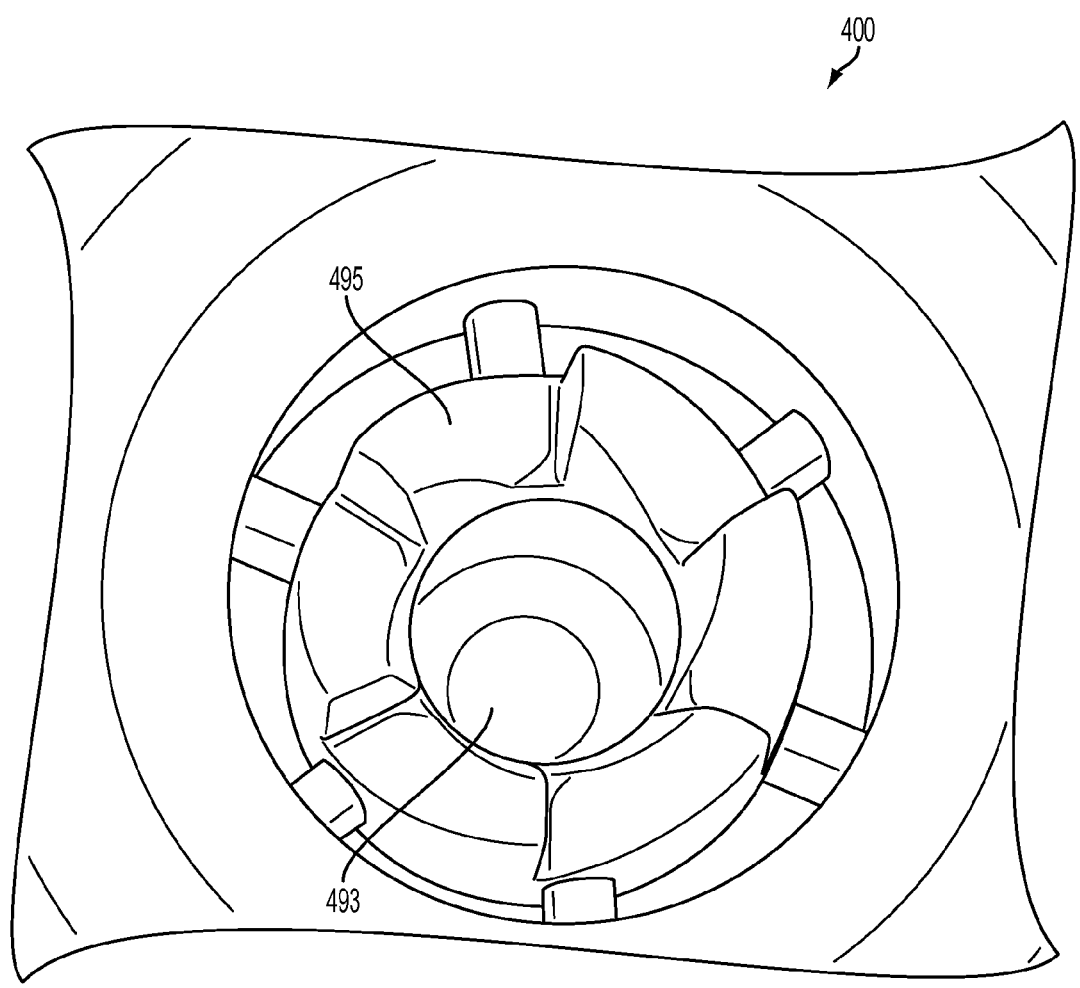
FIG. 6 is an enlarged perspective view that depicts the underside of a lid in accordance with an aspect of the invention.

FIG. 5 depicts an enlarged view of the lid coupling 392, which includes a rounded bull nose tip 393 and a series of slanted fan blade protrusions 395. FIG. 6 depicts an enlarged view of the underside of the lid 400, which includes a recess 493 that receives the bull nose tip 393 of the lid coupling 392. The underside of the lid 400 also includes a series of slanted fan blade indentations 495 that cooperate and mate with the protrusions 395 of the lid coupling 392. When the container 200 is engaged with the base 100 and the driven coupler 210 of the processing assembly 215 is engaged with the drive coupler 130, the lid 400 engages with the lid coupling 392 by pressing the lid 400 down into the top opening 202 of the container 200. As the lid 400 is pressed downwards, the lid coupling 392 rotates about the axis 217 until the fan blade protrusions 395 of the lid coupling 392 slide into the slanted indentations 495 of the underside of the lid. As such, the lid coupling 392 self-seeks a position in which the coupling 392 can be received into the lid recess 493. Once the lid coupling 392 is accepted into the lid recess 493 and the lid 400 is engaged with the top opening 202 of the container, the lid coupling 392 is rotationally fixed relative to the lid 400 and the container 200, and thus the lid coupling 392 can no longer rotate. Consequently, the stationary shaft 390 and the ring gear 380, which are fixed relative to the lid coupling 392, become rotationally fixed relative to the lid 400 and the container 200 as well.

Figure 11:
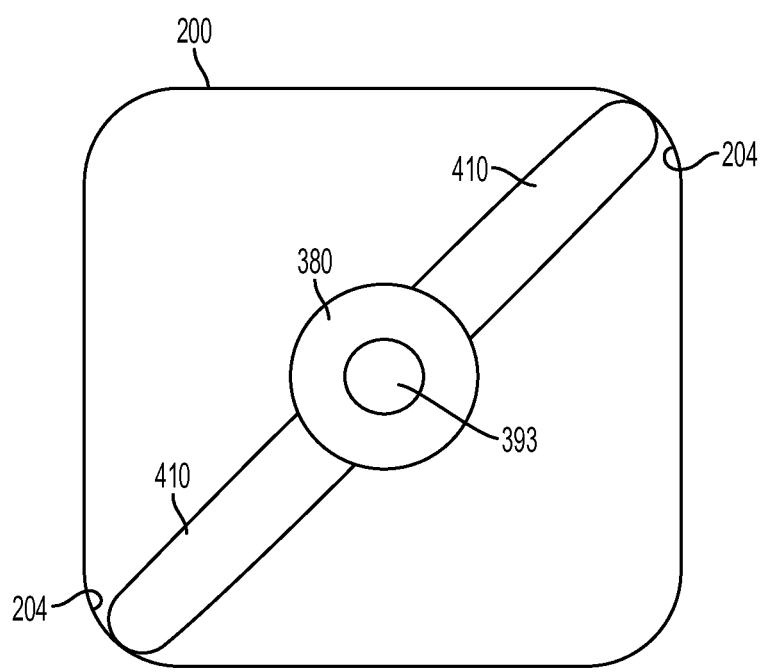
FIG. 11 is a top, cross-sectional view of an alternative embodiment.

It should be appreciated that the ring gear can be rotationally fixed relative to the container without attaching to the lid. In some embodiments, instead of attaching to the lid, the ring gear may be held against the walls or other interior portion of the container. For example, as shown in FIG. 11, in some embodiments, the ring gear 380 may be attached to laterally extending arms 410 which extend outwardly from the processing assembly to contact the internal walls of the container. The container may have a square, rectangular, or otherwise polygonal shape, where two adjacent walls of the container meet at a vertex 204. The arms extend outwardly and abut against the vertices 204 of the container from the inside of the container such that the ring gear cannot rotate within the container due to the abutment between the arms and the vertices of the container. In such an arrangement, the top end of the processing assembly need not be rotationally fixed to the lid. Instead, the top end of the processing assembly may be free to rotate relative to the lid.

Additional details regarding the relationship between the processing assembly and the container and container lid can be found in U.S. patent application entitled "FOOD PROCESSOR," bearing Ser. No. 13/780,783, filed on Feb. 28, 2013, which is herein incorporated by reference in its entirety.

In the illustrated embodiment, the ring gear is attached to two arms that extend from the transmission housing 362 at a 180 degree angle relative to one another, and the cross-section of the food-containing volume of the container is approximately square shaped. When the ring gear is placed into the container, the arms slide down two vertices of the container that are also at a 180 degree angle relative to one another. The length of the two arms and the diameter of the ring gear are equal to the diagonal of the cross-section of the food-containing volume. Because the ring gear and arms span the longest local dimension of the food-containing volume, the ring gear cannot rotate within the food-containing volume. Of course, it should be appreciated that any suitable cross-sectional food-containing volume shape can be used and any number of arms may be used, as this aspect is not so limited.

In other embodiments, the planetary gear system may be configured to drive the output shaft in a direction opposite to that of the input shaft by changing which portion of the planetary gear is held stationary. In one arrangement, instead of the ring gear being held stationary, the planet carrier is held stationary, the ring gear serves as the output shaft, and the sun gear rotates with the input shaft. In such an arrangement, the planetary gear system drives the output shaft in a direction opposite to that of the input shaft and at a speed that is lower than that of the input shaft.

In yet further embodiments, the planetary gear system can be configured as an overdrive type transmission where the output speed is higher than the input speed. To achieve this result, in one arrangement, the sun gear is held stationary, the planet carrier rotates with the input shaft, the ring gear serves as the output shaft. In such an arrangement, the output shaft of the transmission system rotates at a speed higher than that of the input shaft.

Of course, it should be appreciated that the transmission system is not limited to a planetary gear system, as this aspect is not limited in this regard. For example, in some embodiments, the transmission system may utilize a step gear arrangement. In some embodiments, the transmission system may utilize a clutch and pressure plate arrangement.

According to one aspect, with the transmission system located within the food-containing volume, the transmission system is housed in a transmission system housing in an arrangement that prevents the entry of foods into the transmission system housing.

In some embodiments, as seen in FIGS. 1A and 4, the transmission system 300 is enclosed by a bottom cap 360, a transmission housing 362, and a top cap 394. The top cap 394 is attached to the transmission housing 362, and the transmission housing 362 is attached to the bottom cap 360. A lip seal 365 is located within the transmission housing 362 to create a seal between the top cap 394 and the stationary shaft 390 and prevent entry of fluid into the transmission housing 362. The bottom cap 360 is fixed to the transmission housing 362. A bearing 231 is located between the input shaft 280 and the bottom cap 360 such that the input shaft 280 and the bottom cap 360 can rotate at different speeds relative to one another. A lip seal 364 seals against the bottom cap 360 and the input shaft 280 to prevent entry of fluid into the transmission housing 362.

As shown in FIGS. 1A and 4, the bottom cap 360 and the top cap 394 are screwed onto the transmission housing 362 via a series of threads. In some cases, the top and bottom caps 360, 394 can be unscrewed from the transmission housing 362 to permit access to the transmission system 300 for component replacement or maintenance. In some embodiments, the top and bottom caps 360, 394 are permanently attached to the transmission housing 362. The top and bottom caps 360, 394 may attach to the transmission housing 362 in any suitable manner, such as through an interference fit, via mechanical fasteners, with an adhesive, or via ultrasonic welding. The top and/or bottom caps 360, 394 may also be integrally formed with the transmission housing 362.

According to yet another aspect, the processing tool that is rotated at a higher speed may be used for a method of processing that benefits from a higher rotation speed, such puréeing or liquefying. The processing tool that is rotated at a lower speed may be used for a method of processing that uses a lower rotation speed, such as shredding, grating, slicing, or chopping.

Figure 7:
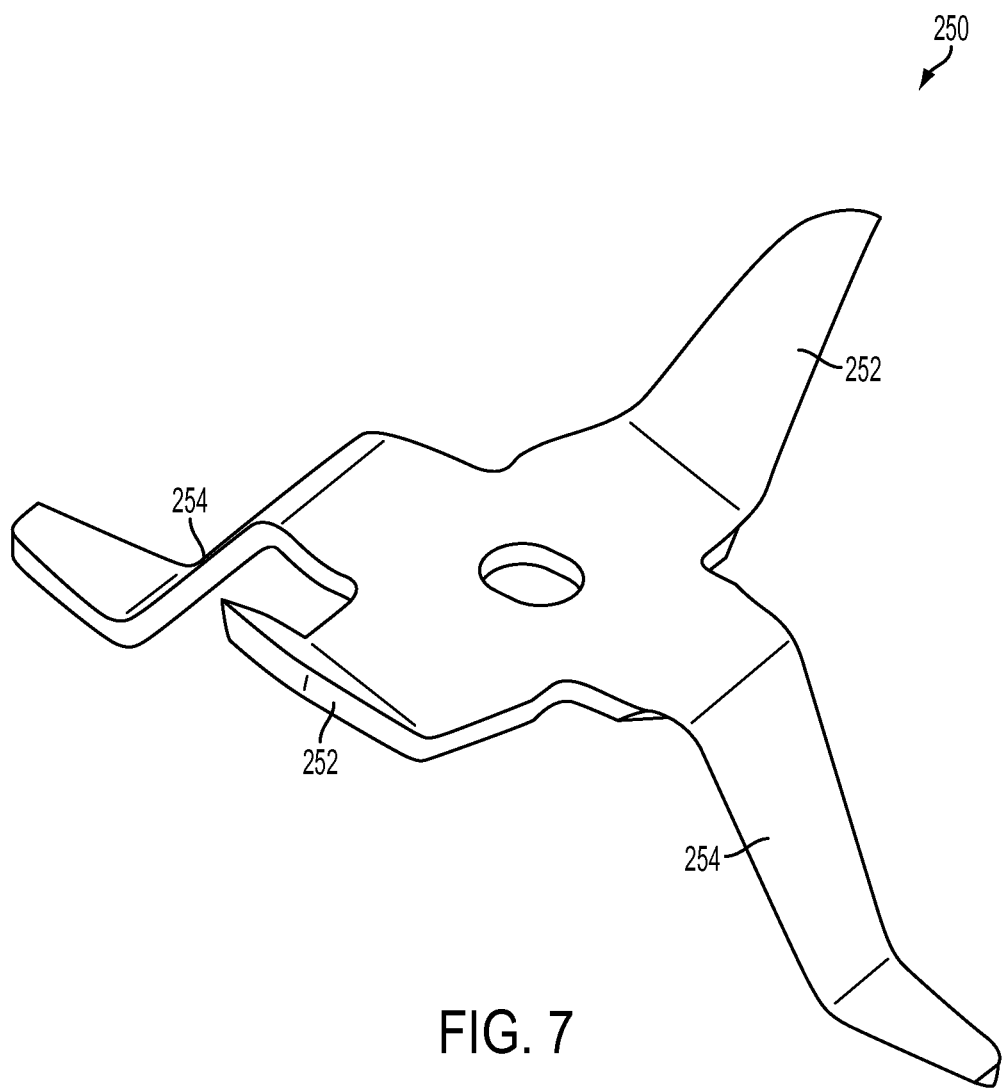
FIG. 7 is a perspective view that depicts a first blade assembly in accordance with an aspect of the invention.

In some embodiments, the processing tool that is rotated at a higher speed may include blades with an upward and/or downward blade pitch. Such an arrangement may help to create a vortex effect within the food-containing volume to enhance mixing and circulation of the food, thereby promoting more effective pureeing of the food. For example, in some embodiments, the upwardly angled blades can create a vertical circulation, and the downwardly angled blades can be effective at pureeing and/or liquefying the food. In one embodiment, as shown in FIG. 7, the first blade assembly 250 includes two upwardly angled blades 252 and two downwardly angled blades 254. In some cases, the blades 252 and 254 may be formed from a single unitary body, as shown in FIG. 7. In other cases, the blades 252 and 254 may be joined together via welding, an adhesive, or other suitable arrangement.

Figure 8:
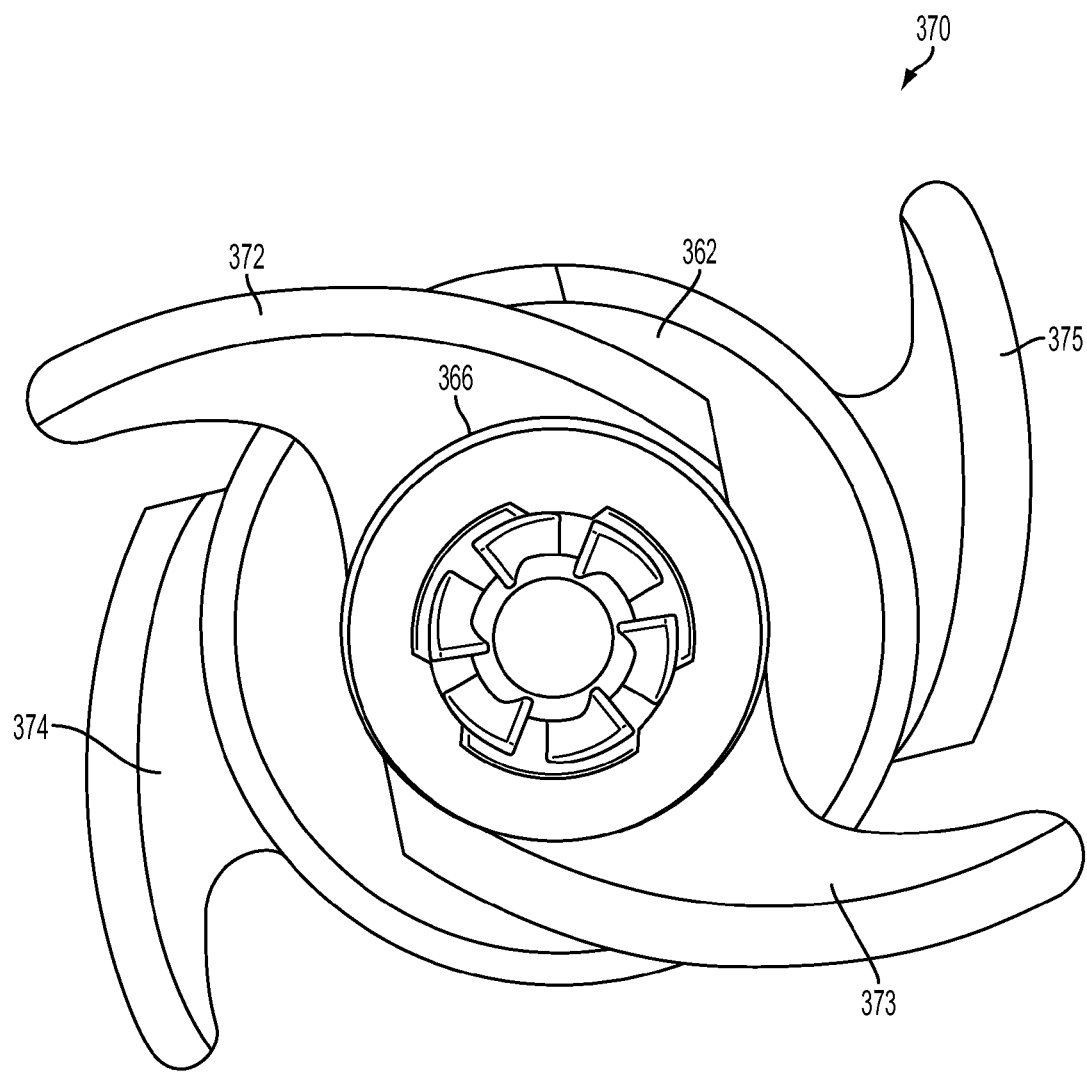
FIG. 8 is a top view that depicts a second blade assembly in accordance with an aspect of the invention.
Figure 9:
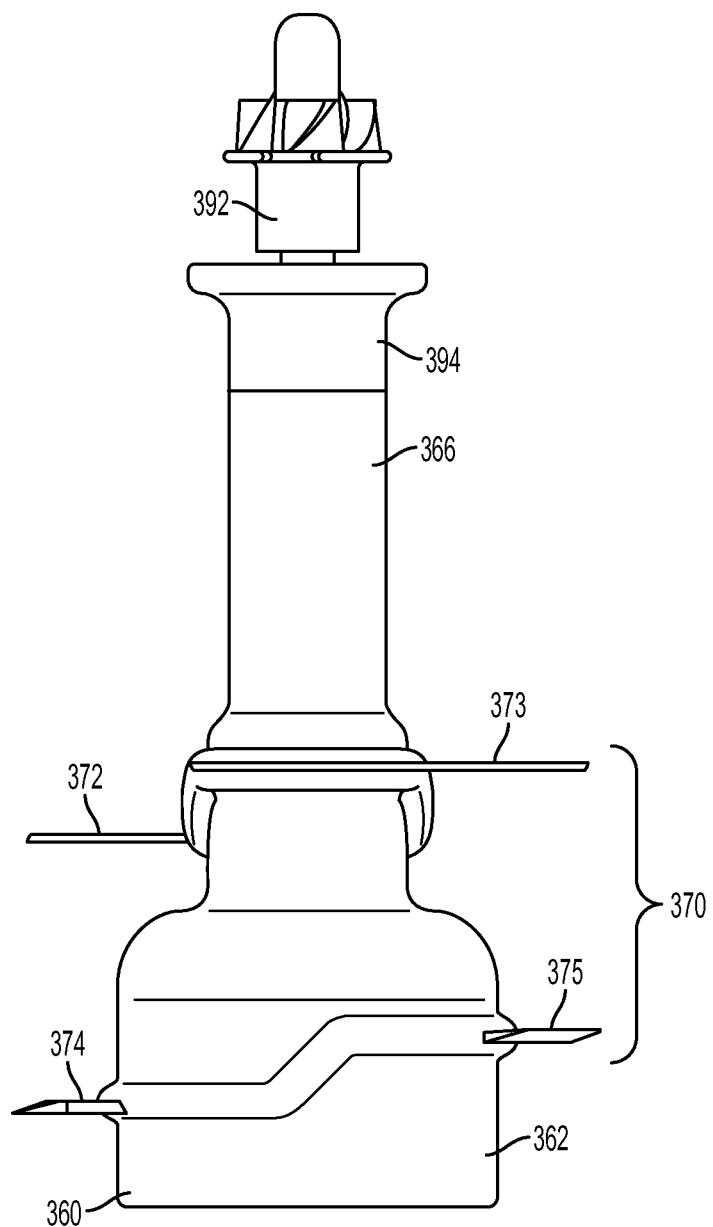
FIG. 9 is a side view that depicts the second blade assembly depicted in FIG. 8.
Figure 10:
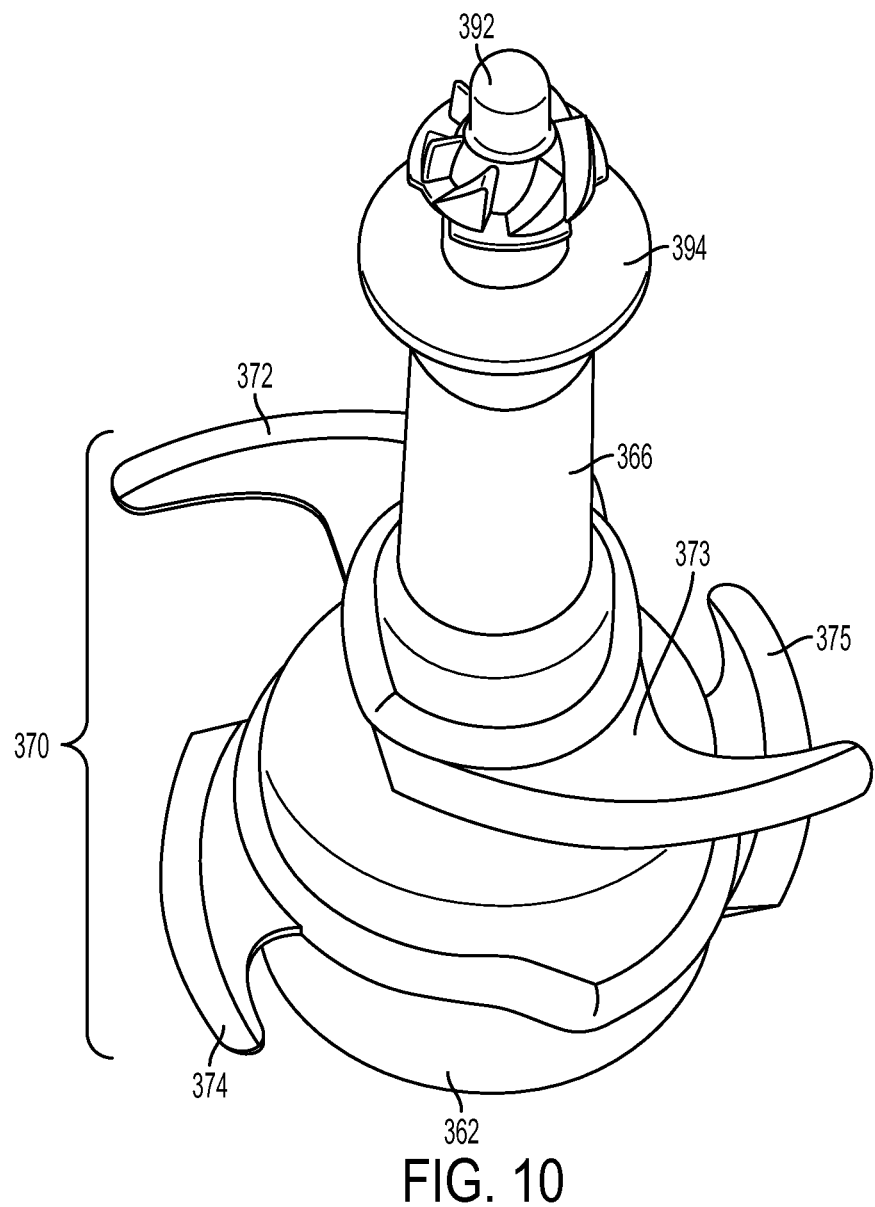
FIG. 10 is a perspective view that depicts the second blade assembly depicted in FIG. 8.

In some embodiments, the blades of the processing tool that is rotated at a lower speed may have a blade pitch that is smaller than that of the blades of the processing tool that is rotated at a higher speed. A smaller blade pitch may permit the processing tool to more easily chop, shred, grate, and/or slice. In some cases, sharp, thin blades with a smaller blade pitch for chopping and slicing may be susceptible to breaking or snapping at high rotation speeds, and thus a lower rotation speed may help to mitigate this risk. In other cases, however, blades with small blade pitches may not be susceptible to such breaking or snapping and may be rotated at high speeds. In one embodiment, as shown in FIG. 8, second blade assembly 370 includes blades 372-375. As shown in FIG. 9, each blade 372-375 may have little to no blade pitch and may thus be arranged in a horizontal plane. In addition, each blade 372-375 may be nearly or substantially flat. The leading edge of such blades may be rearwardly curved in some embodiments. In some cases, the first blade 372 and the second blade 373 may be formed from a single unitary component. In other cases, the first blade 372 and the second blade 373 may be separate blades. The first and second blades 372, 373 may be attached to the output shaft 366 and/or the transmission housing 362 in any suitable manner such as by overmolding, with fasteners, with mechanical locking arrangements, with an adhesive, or by other suitable manner. Similarly, in some cases, the third blade 374 and the fourth blade 375 may be formed from a single unitary component or may be separate blades. The third and fourth blades 374, 375 may be attached to the output shaft 366 and/or the transmission housing 362 via overmolding, fasteners, mechanical locking arrangements, adhesives, or by other suitable manner. In some cases, the blades 372-375 may be removable from their corresponding shafts for cleaning, sharpening or replacement.

Additional details regarding possible blade arrangements, shapes and dimensions can be found in U.S. patent application entitled "FOOD PROCESSOR," bearing Ser. No. 13/781,743, filed on Feb. 28, 2013, which is herein incorporated by reference in its entirety.

Figure 12:
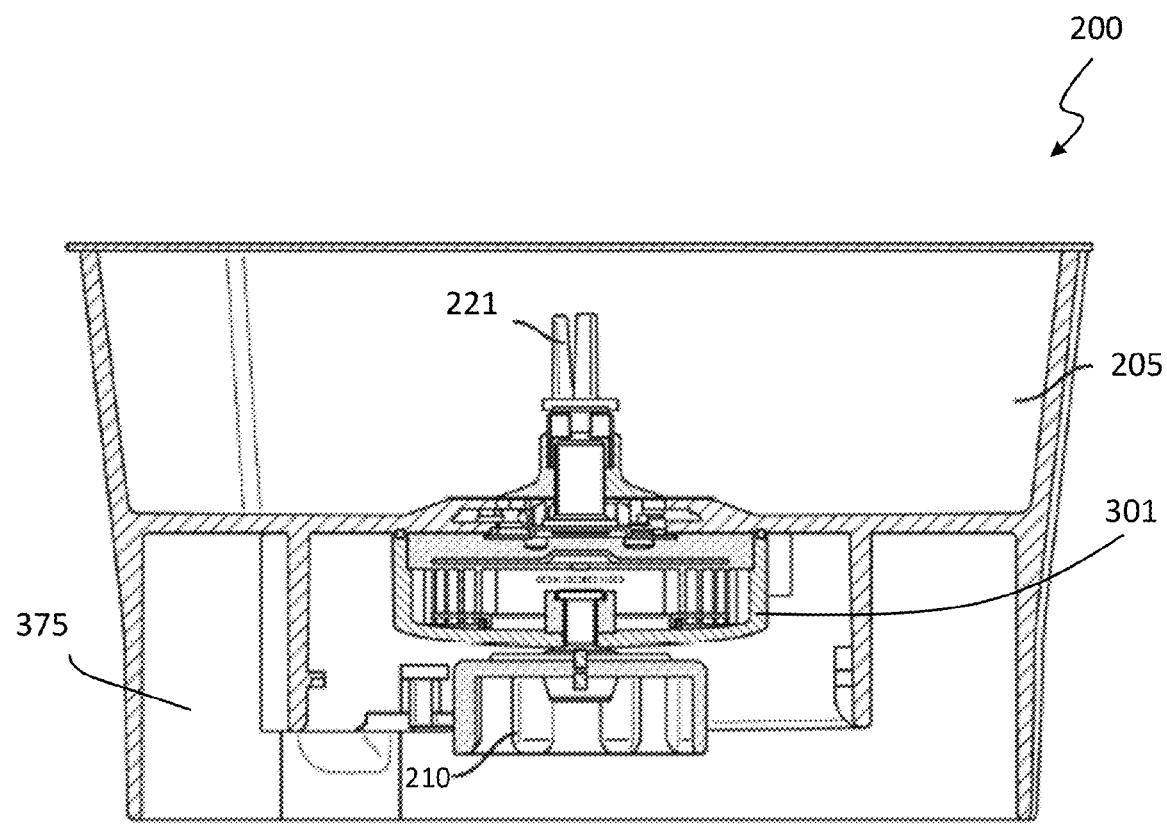
FIG. 12 is a cross-sectional view that depicts a transmission system integrated into a container base in accordance with an aspect of the invention.

In some embodiments, the container may also include a transmission system in the bottom of the container, external to the food-containing volume. As shown in FIG. 12, a transmission system 301 may be integrated into the base 375 of the container 200, where the transmission system 301 is positioned external to the food-containing volume 205. The transmission system 301 may change the speed and/or direction of shaft 221 relative to that of the driven coupler 210. Shaft 221 may then serve as or be coupled to the first blade shaft 220 shown in FIG. 2. In this manner, an additional transmission system 301 may be integrated into the processing assembly 215 of FIG. 2.

The transmission system 301 may serve as a reduction type transmission or an overdrive type transmission. Where the transmission system 301 is a reduction type transmission, the transmission system 301 may have any suitable gear reduction, as this aspect is not limited in this regard, For example, the transmission system 301 may have a gear reduction ratio of 2:1, 3:1, 4:1, 5:1, 6:1, 7:1, 8:1, 9:1, or 10:1. Where the transmission system 301 is an overdrive type transmission, the transmission system 301 may have any suitable overdrive ratio, as this aspect is not limited in this regard, For example, the transmission system 301 may have an overdrive ratio of 1:2, 1:3, 1:4, 1:5, 1:6, 1:7, 1:8, 1:9, or 1:10. The transmission system 301 may be any suitable transmission system, such as, but not limited to, a planetary gear system, a step gear system, worm gears, beveled gears, and/or spur gears.

The above described components may be made with various materials, as the invention is not necessarily so limited.

The above aspects may be employed in any suitable combination, as the present invention is not limited in this respect. Additionally, any or all of the above aspects may be employed in a food processing apparatus; however, the present invention is not limited in this respect, as the above aspects may be employed to process materials other than food.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A food processing apparatus comprising:
a container;
a lid;
a food-containing volume defined between the lid and the container;
a processing assembly that couples to the container, the processing assembly including a transmission system, wherein, when the processing assembly is coupled to the container, the transmission system is positioned in the food-containing volume; and
an input shaft connected to the transmission system and an output shaft connected to the transmission system, wherein rotation of the input shaft at a first speed causes the output shaft to rotate at a second speed, the second speed different from the first speed.

2. The food processing apparatus of claim 1, wherein the second speed is lower than the first speed.

3. The food processing apparatus of claim 1, wherein the second speed is higher than the first speed.

4. The food processing apparatus of claim 1, wherein the transmission system comprises a planetary gear system.

5. The food processing apparatus of claim 1, wherein the processing assembly includes a driven coupler which is external to the food-containing volume and engages with a drive coupler.

6. The food processing apparatus of claim 1, further comprising a base with a drive coupler,
wherein:
the container engages with the base; and
the driven coupler of the processing assembly engages with the drive coupler of the base.

7. The food processing apparatus of claim 1, wherein a portion of the transmission system remains rotationally fixed relative to the container when the processing assembly is driven.

8. The food processing apparatus of claim 7, wherein the transmission system comprises a planetary gear system.

9. The food processing apparatus of claim 8, wherein the portion of the transmission system that remains rotationally fixed relative to the container includes a ring gear.

10. The food processing apparatus of claim 9, further comprising a holding member arranged to hold the ring gear rotationally stationary relative to the container, the holding member interacting with an interior of the container.

11. The food processing apparatus of claim 1, wherein:
the processing assembly further includes first and second processing tools;
the first processing tool comprises at least two upwardly angled blades and at least two downwardly angled blades; and
the second processing tool comprises at least two substantially flat blades arranged in a horizontal plane.

12. The food processing apparatus of claim 1, wherein:
the input shaft is attached to a sun gear, the sun gear having an axis of rotation;
the sun gear is constructed and arranged to drive a plurality of planet gears such that each planet gear rotates about its own individual planet axis and revolves around the sun gear;
the planet gears are coupled to a planet carrier such that revolution of the planet gears around the sun gear causes the planet carrier to rotate about the axis of rotation of the sun gear; and
the planet carrier is rotationally fixed to the output shaft.

13. The food processing apparatus of claim 12, wherein the planet carrier is attached to a planetary drive coupling, the planetary drive coupling is attached to a bottom cap, and the bottom cap is attached to the output shaft.

14. The food processing apparatus of claim 12, wherein the planet carrier comprises an upper plate, a lower plate, and a plurality of axles, each axle corresponding with one of the plurality of planet gears, wherein each axle passes through a longitudinal axis of its corresponding planet gear.

15. A food processing apparatus comprising:
a container having a food-containing volume;
a processing assembly including first and second processing tools and a transmission system, wherein the transmission system is positioned directly between the first processing tool and the second processing tool,
wherein, when the processing assembly is mounted to the container, the first and second processing tools are located within the food-containing volume, and the transmission system is vertically positioned between a height of the first processing tool and a height of the second processing tool; and
an input shaft connected to the transmission system and an output shaft connected to the transmission system, wherein rotation of the input shaft at a first speed causes the output shaft to rotate at a second speed, the second speed different from the first speed.

16. The food processing apparatus of claim 15, wherein a longitudinal axis of the transmission system is collinear with axes of rotation of the first processing tool and the second processing tool.

17. The food processing apparatus of claim 15, further comprising a lid that engages with the container, wherein a portion of the processing assembly remains rotationally fixed relative to the lid when the processing assembly is driven.

18. The food processing apparatus of claim 15, wherein the second speed is lower than the first speed.

19. The food processing apparatus of claim 15, further comprising a base with a drive coupler,
wherein:
the container engages with the base; and
a driven coupler of the processing assembly engages with the drive coupler of the base.

20. The food processing apparatus of claim 15, wherein the first processing tool comprises at least two upwardly angled blades and at least two downwardly angled blades, and the second processing tool comprises at least two substantially flat blades arranged in a horizontal plane.

21. A method of coupling a processing assembly to a container, wherein a lid is engagable with the container to define a food-containing volume, the method comprising:
coupling a processing assembly to the container, the processing assembly including a transmission system, such that when the processing assembly is coupled to the container, the transmission system is positioned in the food-containing volume; and
connecting an input shaft to the transmission system and an output shaft to the transmission system, such that rotating the input shaft at a first speed causes the output shaft to rotate at a second speed, the second speed different from the first speed.

* * * * *